United States Patent [19]

Murakami

[11] Patent Number: 4,972,016
[45] Date of Patent: Nov. 20, 1990

[54] POLY(CYANOARYLETHER)-BASED RESIN COMPOSITION

[75] Inventor: Tomoyoshi Murakami, Sodegaura, Japan

[73] Assignee: Idemitsu Kosan Company Limited, Tokyo, Japan

[21] Appl. No.: 494,948

[22] Filed: Mar. 14, 1990

Related U.S. Application Data

[63] Continuation of Ser. No. 287,891, Dec. 21, 1988, abandoned.

[30] Foreign Application Priority Data

Jan. 29, 1988 [JP] Japan .................. 63-16844

[51] Int. Cl.$^5$ .................. C08K 3/36; C08K 3/04
[52] U.S. Cl. .................. 524/449; 524/451; 524/496; 524/611
[58] Field of Search .............. 524/449, 451, 611, 496

[56] References Cited

U.S. PATENT DOCUMENTS

| | | |
|---|---|---|
| 4,640,975 | 2/1987 | Matsuo et al. |
| 4,699,942 | 10/1987 | Weaver et al. .................. 524/451 |
| 4,812,507 | 3/1989 | Matsuo et al. .................. 524/611 |
| 4,853,443 | 8/1989 | Matsuo et al. .................. 525/463 |

FOREIGN PATENT DOCUMENTS

| | | |
|---|---|---|
| 0121257 | 10/1984 | European Pat. Off. |
| 0187638 | 7/1986 | European Pat. Off. |
| 0193003 | 9/1986 | European Pat. Off. |
| 0243000 | 10/1987 | European Pat. Off. |
| 61-162523 | 7/1986 | Japan . |
| 62-44016 | 9/1987 | Japan . |
| 62-223226 | 10/1987 | Japan . |
| 62-240353 | 10/1987 | Japan . |

OTHER PUBLICATIONS

Plastic Additives Handbook, "Stabilizers, Processing Aids, Plasticizers, Fillers, Reinforcements, Colorants for Thermoplastics", pp. 671–675 (1987).

Primary Examiner—Lewis T. Jacobs
Attorney, Agent, or Firm—Frishauf, Holtz, Goodman & Woodward

[57] ABSTRACT

The present invention relates to a poly(cyanoarylether)-based resin composition comprising 100 parts by weight of poly(cyanoarylether) having a repeating unit represented by the formula:

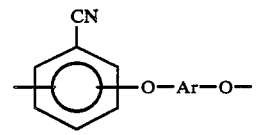

(wherein Ar is

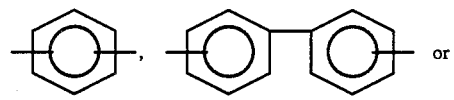 or

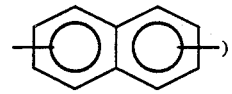

)

as a main constitutional component and 0.01 to 3 parts by weight of at least one crystallization nucleating agent selected from the group consisting of talc, mica and carbon black each having a particle diameter of not more than 3 μm.

In the composition of the present invention, the rate of crystallization of poly(cyanoarylether) is greatly improved. Thus, the productivity of molding can be increased. Furthermore, the composition of the present invention can provide moldings having excellent heat resistance without annealing.

4 Claims, No Drawings

POLY(CYANOARYLETHER)-BASED RESIN COMPOSITION

This application is a continuation of application Ser. No. 287,891 filed Dec. 21, 1988, now abandoned.

BACKGROUND OF THE INVENTION

The present invention relates to a resin composition containing poly(cyanoarylether), which permits to increase conductivity in molding.

Various types of poly(cyanoarylether) have heretofore been known as described in Japanese Patent Publication No. 44016/1987 (European patent application EP No. 0121257A2), Japanese patent application Laid-Open No. 162523/1986 (U.S Pat. No. 4,640,975) and Japanese patent application Laid-Open No. 223226/1987.

The conventional poly(cyanoarylether)s, however, have disadvantages in that the molding cycle time in production of moldings by techniques such as injection molding is relatively long and thus the productivity is low, because the rate of crystallization is relatively slow, although they have excellent mechanical characteristics and heat resistance.

The present inventors have proposed a poly(cyanoarylether)-based resin composition for molding, containing a crystallization nucleating agent, e.g., alumina and titanium dioxide, as described in Japanese patent application Laid-Open No. 240353/1987. This composition can provide moldings having a high degree of crystallization and excellent in heat resistance. In the composition, however, it cannot be said that a sufficient research has been made in connection with the rate of crystallization.

SUMMARY OF THE INVENTION

The present invention is intended to overcome the above problems, and the object of the present invention is to provide a poly(cyanoarylether)-based resin composition which can increase productivity in molding of poly(cyanoarylether) because it has a great effect of improving the rate of crystallization, and further which can provide moldings having a high degree of crystallization and excellent in heat resistance.

The present inventors have already disclosed a technique to add mica having an average particle diameter of 5 μm as a crystallization nucleating agent in Comparative Example 5 of Japanese patent application Laid-Open No. 240353/1987. In accordance with this technique, however, only a resin composition having a low rate of crystallization can be obtained.

As a result of further investigations, it has been found that mica and the like having a small particle diameter is effective as a crystallization nucleating agent for a poly(cyanoarylether)-based resin. Based on the findings, the present invention has been completed.

The present invention relates to a poly(cyanoarylether)-based resin composition comprising 100 parts by weight of poly(cyanoarylether) having a repeating unit represented by the formula:

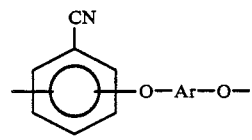
(I)

(wherein Ar is

)

as a main constitutional unit and 0.01 to 3 parts by weight of at least one crystallization nucleating agent selected from the group consisting of talc, mica and carbon black, having a particle diameter of not more than 3 μm.

DETAILED DESCRIPTION OF THE INVENTION

The poly(cyanoarylether) to be used in the present invention has a repeating unit represented by the formula:

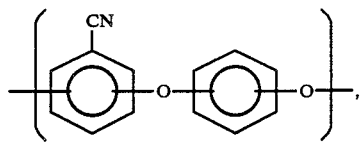

a repeating unit represented by the formula:

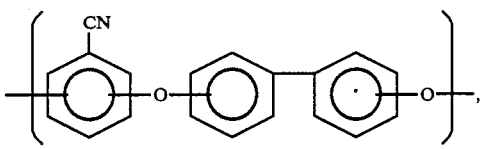

or a repeating unit represented by the formula:

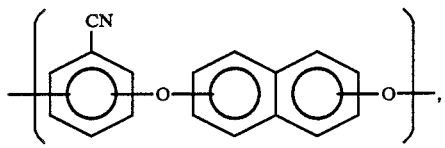

as a main constitutional component.

The poly(cyanoarylether) and a process for the production thereof are disclosed in Japanese patent application Laid-Open Nos. 162523/1986 (U.S. Pat. No. 4,640,975), 223226/1987, and 240353/1987.

The poly(cyanoarylether) to be used in the present invention is composed mainly of the repeating unit of the formula (I). In particular, poly(cyanoarylether) having at least 90 mol % of the repeating unit of the formula (I) is preferably used.

As the poly(cyanoarylether) to be used in the present invention, copolymers as obtained by copolymerization of the unit of the formula (I) and other constitutional unit or units within the range that does not decrease the crystalinity of the resulting polymer can also be used.

The constitutional unit of the copolymer is, for example, a repeating unit represented by the formula:

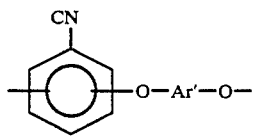
(II)

(wherein Ar' is

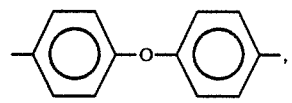,

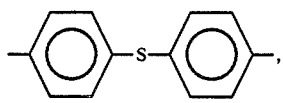,

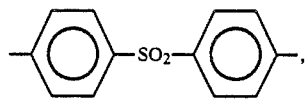,

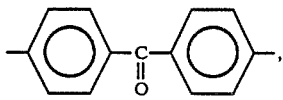,

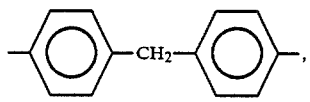,

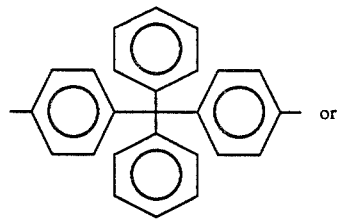 or

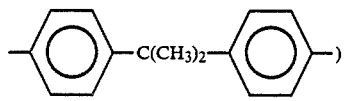)

or a repeating unit represented by the formula:

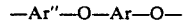 (III)

(wherein Ar" is

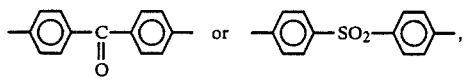, and Ar is the same as defined in the formula (I)).

Copolymers containing one or more of the above described repeating units along with the repeating unit of the formula (I) can be used.

In the composition of the present invention, two or more of the above poly(cyanoarylether)s can be used in combination with each other.

The molecular weight of the poly(cyanoarylether) to be used in the present invention is not critical. The reduced viscosity ($\eta sp/c$) as determined at 60° C. using a 0.2 g/dl solution of the polymer in p-chlorophenol as a solvent is preferably 0.3 to 2.0 dl/g.

The crystallization nucleating agent that can be used in the present invention is at least one selected from talc, mica and carbon black each having a particle diameter of not more than 3 μm, preferably not more than 1 μm. Of these, talc is particularly preferred. The amount of the crystallization nucleating agent added is 0.01 to 3 parts by weight, preferably 0.1 to 2 parts by weight and more preferably 0.1 to 1 part by weight per 100 parts by weight of the poly(cyanoarylether).

If the particle diameter of the crystallization nucleating agent is in excess of 3 μm, the rate of crystallization of poly(cyanoarylether) is low and the effect of the present invention cannot be obtained.

If the amount of the crystallization nucleating agent added is less than 0.01 part by weight, the effect is low. On the other hand, if it is more than 3 parts by weight, the material is undesirably deteriorated.

The composition of the present invention can be prepared by blending the poly(cyanoarylether) resin and the crystallization nucleating agent, and melting and extruding the resulting mixture.

There are not special limitations to the blending method. The usual methods, e.g., a method in which the poly(cyanoarylether) and the crystallization nucleating agent are powder blended and then melted and kneaded can be employed.

For the purpose of increasing the dispersibility of the crystallization nucleating agent, the crystallization nucleating agent can be added at the time of initiating the polymerization of poly(cyanoarylether).

In the composition of the present invention, the rate of crystallization of poly(cyanoarylether) is greatly improved. Thus, the productivity of molding can be increased. Furthermore, the composition of the present invention can provide moldings having excellent heat resistance without annealing, and has advantages in that the molding cycle is shortened, the productivity is increased, and the energy is saved.

The present invention is described in greater detail with reference to the following examples.

EXAMPLES 1 to 5

Poly(cyanoarylether) having a repeating unit of

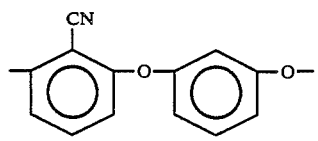

and a reduced viscosity ($\eta sp/c$) of 1.3 was prepared from resorcinol and 2,6-dichlorobenzonitrile. Then, 100 parts by weight of the poly(cyanoarylether) was powder blended with the crystallization nucleating agent in the amount both shown in Table 1, and the resulting mixture was melt kneaded at a temperature of 350° C. for 5 minutes.

The kneaded material was pelletized and measured for half amount crystallization time by the use of DSC produced by Perkin Elmer Corp.

The pellets were melted at a temperature of 370° C. and cooled to a temperature of 280° C. at a cooling rate of 8.3° C./sec, and the half amount crystallization time was measured.

The results are shown in Table 1.

EXAMPLES 6 to 7

Poly(cyanoarylether) having a repeating unit of

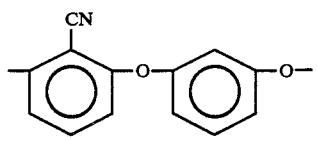

and a reduced viscosity ($\eta sp/c$) of 1.2 was prepared from hydroquinone and 2,6-dichlorobenzonitrile. Then, 100 parts by weight of the poly(cyanoarylether) was powder blended with talc as a nucleating agent in the amount shown in Table 1, and the resulting mixture was melt kneaded at 380° C. for 5 minutes. The half amount crystallization time was measured in the same manner as in Example 1 except that the melting temperature was changed to 390° C.

The results are shown in Table 1.

COMPARATIVE EXAMPLE 1

The half amount crystallization time of the poly(cyanoarylether) used in Example 1 was measured in the same manner as in Example 1. The results are shown in Table 1.

COMPARATIVE EXAMPLE 2

A composition was prepared in the same manner as in Example 3 except that talc having a particle diameter of 5 μm was used as the crystallization nucleating agent.

The results are shown in Table 1.

COMPARATIVE EXAMPLE 3

The half amount crystallization time of the poly(cyanoarylether) used in Example 6 was measured in the same manner as in Example 1. The results are shown in Table 1.

COMPARATIVE EXAMPLE 4

A composition was prepared in the same manner as in Example 6 except that talc having a particle diameter of 5 μm was used as the crystallization nucleating agent. The results are shown in Table 1.

TABLE 1

| | Crystallization Nucleating Agent | | | Half Amount |
| | Type | Particle Diameter (μm) | Amount (parts by weight) | Crystallization Time at 280° C. (sec) |
| --- | --- | --- | --- | --- |
| Example 1 | Talc | 0.5 | 0.2 | 65 |
| Example 2 | Talc | 0.5 | 0.5 | 58 |
| Example 3 | Talc | 0.5 | 2.0 | 62 |
| Comparative Example 1 | — | — | — | 120 |
| Comparative Example 2 | Talc | 5.0 | 2.0 | 115 |
| Example 4 | Mica | 0.5 | 2.0 | 105 |
| Example 5 | Carbon | 0.2 | 1.0 | 105 |
| Example 6 | Talc | 0.5 | 1.0 | 85 |

TABLE 1-continued

| | Crystallization Nucleating Agent | | | Half Amount |
| | Type | Particle Diameter (μm) | Amount (parts by weight) | Crystallization Time at 280° C. (sec) |
| --- | --- | --- | --- | --- |
| Example 7 | Talc | 2.0 | 3.0 | 92 |
| Comparative Example 3 | — | — | — | 200 |
| Comparative Example 4 | Talc | 5.0 | 1.0 | 196 |

EXAMPLE 8

A polymer having a repeating unit of

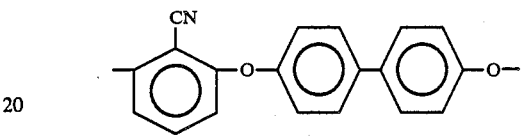

and having a reduced viscosity ($\eta sp/c$) of 1.0 dl/g was prepared from p-bisphenol and 2,6-dichlorobenzonitrile. Then, 100 parts by weight of the polymer was powder blended with talc in the amount shown in Table 2, and then the resulting mixture was melt kneaded at a temperature of 380° C. for 5 minutes.

The half amount crystallization time was measured in the same manner as in Example 1 except that the melting temperature was changed to 390° C.

The results are shown in Table 2.

EXAMPLE 9

A polymer having a repeating unit of

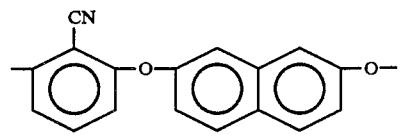

and having a reduced viscosity ($\eta sp/c$) of 0.6 dl/g was prepared from 2,7-dihydroxynaphthalene and 2,6-dichlorobenzonitrile. Then, 100 parts by weight of the polymer was powder blended with talc in the amount shown in Table 2, and then the resulting mixture was melt kneaded at 380° C. for 5 minutes.

The half amount crystallization time was measured in the same manner as in Example 1 except that the melting temperature was changed to 390° C.

The results are shown in Table 2.

COMPARATIVE EXAMPLES 5 and 6

The procedures of Examples 8 and 9 were repeated with the exception that the talc was not blended. The results are shown in Table 2.

TABLE 2

| | Crystallization Nucleating Agent | | | Half Amount |
| | Type | Particle Diameter (μm) | Amount (parts by weight) | Crystallization Time at 280° C. (sec) |
| --- | --- | --- | --- | --- |
| Example 8 | Talc | 0.5 | 2 | 118 |
| Comparative Example 5 | — | — | — | 685 |
| Example 9 | Talc | 0.5 | 2 | 759 |
| Comparative | — | — | — | 947 |

What is claimed is:

1. A poly(cyanoarylether)-based resin composition comprising 100 parts by weight of poly(cyanoarylether) having a repeating unit represented by the formula:

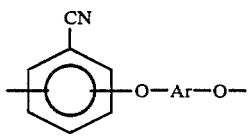

(wherein Ar is

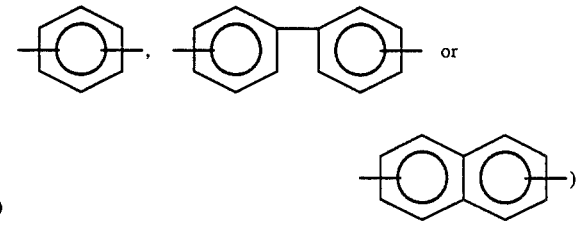

as a main constitutional component and 0.01 to 3 parts by weight of at least one crystallization nucleating agent selected from the group consisting of talc, mica and carbon black each having a particle diameter of not more than 3 μm.

2. The composition as claimed in claim 1 wherein the crystallization nucleating agent is talc.

3. The composition as claimed in claim 1 wherein the amount of the nucleating agent used is 0.1 to 2 parts by weight per 100 parts by weight of the poly(cyanoarylether).

4. The composition as claimed in claim 1 wherein the particle diameter of the crystallization nucleating agent is not more than 1 μm

* * * * *